United States Patent
Laasch et al.

(10) Patent No.: US 12,288,852 B2
(45) Date of Patent: Apr. 29, 2025

(54) BATTERY MANAGEMENT SYSTEM FOR A HIGH-VOLTAGE BATTERY OF A MOTOR VEHICLE, HIGH-VOLTAGE BATTERY, AND MOTOR VEHICLE

(71) Applicant: Bayerische Motoren Werke Aktiengesellschaft, Munich (DE)

(72) Inventors: Felix Laasch, Munich (DE); Florian Pritscher, Munich (DE); Tobias Schmieg, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 216 days.

(21) Appl. No.: 16/978,851

(22) PCT Filed: Jun. 6, 2019

(86) PCT No.: PCT/EP2019/064906
§ 371 (c)(1),
(2) Date: Sep. 8, 2020

(87) PCT Pub. No.: WO2020/007568
PCT Pub. Date: Jan. 9, 2020

(65) Prior Publication Data
US 2020/0411914 A1    Dec. 31, 2020

(30) Foreign Application Priority Data
Jul. 4, 2018 (DE) .................... 10 2018 210 975.3

(51) Int. Cl.
*H01M 10/42*  (2006.01)
*H01M 10/48*  (2006.01)

(52) U.S. Cl.
CPC ..... *H01M 10/4257* (2013.01); *H01M 10/482* (2013.01); *H01M 2010/4271* (2013.01); *H01M 2200/20* (2013.01); *H01M 2220/20* (2013.01)

(58) Field of Classification Search
CPC ........... H01M 10/482; H01M 10/4257; H01M 2010/4271; H01M 2010/4278;
(Continued)

(56) References Cited

U.S. PATENT DOCUMENTS

| 2011/0174084 A1 | 7/2011 | West et al. |
| 2012/0105001 A1 | 5/2012 | Gallegos et al. |

(Continued)

FOREIGN PATENT DOCUMENTS

| CN | 105589046 A | * | 5/2016 | .......... H01M 10/482 |
| CN | 206116475 U |   | 4/2017 | |

(Continued)

OTHER PUBLICATIONS

CN105589046A, Wang, et al., "Detection and alarm method of power battery pack thermal runaway diffusion", Date retrieved from https://worldwide.espacenet.com/ May 18, 2022 (Year: 2016).*

(Continued)

*Primary Examiner* — Ekandra S. Miller-Cruz
*Assistant Examiner* — Jared Hansen
(74) *Attorney, Agent, or Firm* — Crowell & Moring LLP

(57) ABSTRACT

A battery management system for a high-voltage battery of a motor vehicle monitors battery cells of the high-voltage battery. The battery management system can be arranged in a battery housing of the high-voltage battery and has an electronic circuit which is arranged on a circuit carrier and has a processor and a communication interface for communication with at least one vehicle-side unit external to the high-voltage battery. The electronic circuit has at least one pressure sensor, which is designed to detect pressure signals in the battery housing and transmit same to the processor. The processor is designed to detect, on the basis of the transmitted pressure signals, a thermal runaway of at least one battery cell of the high-voltage battery, to generate a (Continued)

signal in the event that a thermal runaway is detected, and to provide the signal of the communication interface for transmission to the unit.

9 Claims, 1 Drawing Sheet

(58) Field of Classification Search
CPC .......... H01M 2200/20; H01M 2220/20; Y02E 60/10; Y02T 10/70; Y02T 90/16; B60L 58/00
See application file for complete search history.

(56) References Cited

U.S. PATENT DOCUMENTS

| | | | |
|---|---|---|---|
| 2013/0033102 A1 | 2/2013 | Goff et al. | |
| 2013/0207613 A1* | 8/2013 | Loncarevic | H02J 7/0016 320/134 |
| 2013/0260192 A1 | 10/2013 | LePort | |
| 2015/0037616 A1* | 2/2015 | Wyatt | H01M 50/296 429/153 |
| 2015/0037662 A1 | 2/2015 | Pinon et al. | |
| 2016/0233482 A1* | 8/2016 | Bosch | H01M 50/271 |
| 2017/0187018 A1* | 6/2017 | Pflueger | H01M 50/333 |
| 2017/0304662 A1* | 10/2017 | Staudenmaier | H01M 50/204 |
| 2018/0198177 A1* | 7/2018 | Chen | H01M 10/48 |
| 2018/0212288 A1* | 7/2018 | Grace | H01M 10/425 |
| 2021/0273283 A1* | 9/2021 | Dittmann | H01M 50/284 |

FOREIGN PATENT DOCUMENTS

| | | | | |
|---|---|---|---|---|
| CN | 106983970 A | * | 7/2017 | ............... A62C 3/07 |
| CN | 108631015 A | * | 10/2018 | ............ H01M 10/482 |
| DE | 102011112632 A1 | * | 3/2013 | ............. H01M 10/42 |
| DE | 102012021095 A1 | * | 5/2013 | .......... B60L 11/1874 |
| DE | 102012009385 A1 | * | 11/2013 | ............. H01M 50/20 |
| DE | 102013213909 A1 | * | 1/2015 | ............. H01M 2/1223 |
| DE | 102016115645 A1 | * | 3/2018 | ............. H01M 50/20 |
| EP | 1921020 A1 | * | 5/2008 | ............... F21V 31/03 |
| EP | 2815637 B1 | * | 4/2018 | ............ H05K 5/0213 |
| EP | 3 333 965 A2 | | 6/2018 | |
| EP | 3840083 A1 | * | 6/2021 | ........ H01M 10/4207 |
| WO | WO-2017178564 A1 | * | 10/2017 | .......... H01M 2/0237 |

OTHER PUBLICATIONS

CN106983970A, Hong et al., "Fire early warning and fire extinguishing control device and method", Date retrieved from https://worldwide.espacenet.com/ May 18, 2022 (Year: 2017).*
CN108631015A, Zhao, et al., "Battery pack abnormality detecting device and battery pack abnormality detecting method", Date retrieved from https://worldwide.espacenet.com/ May 18, 2022 (Year: 2018).*
EP1921020A1, Geissler, "Pressure compensation element for a casing", machine English translation retrieved from https://worldwide.espacenet.com/ Date: May 10, 2023 (Year: 2008).*
EP2815637B1, Pflueger, "Pressure compensation element having a diaphragm, housing, battery cell module and motor vehicle", retrieved from https://worldwide.espacenet.com/ Date: May 10, 2023 (Year: 2018).*
DE102011112632A1, Schmidt, et al., "Battery e.g. lithium-ion high-voltage battery mounted in vehicle . . . ", machine English translation retrieved from https://worldwide.espacenet.com/ Date: Jan. 26, 2024 (Year: 2013).*
DE102012009385A1, Dorsch, et al., "High volt battery for vehicle . . . ", machine English translation retrieved from https://worldwide.espacenet.com/ Date: Jan. 26, 2024 (Year: 2013).*
DE102013213909A1, Gendlin, et al., "Device for regulating the internal pressure in a housing surrounding a battery cell . . . ", machine English translation retrieved from https://worldwide.espacenet.com/ Date: Jan. 26, 2024 (Year: 2015).*
WO2017178564A1, Asensio-Glinsek, et al., "Pressure relief device for a battery housing . . . ", machine English translation retrieved from https://worldwide.espacenet.com/ Date: Jan. 26, 2024 (Year: 2017).*
DE102016115645A1, Guenther, "battery case", machine English translation retrieved from https://worldwide.espacenet.com/ Date: Jan. 26, 2024 (Year: 2018).*
DE102012021095A1, Pastor, et al. "Battery i.e. lithium-ion-battery, for vehicle e.g. . . . ", machine English translation retrieved from https://worldwide.espacenet.com/ Date: Sep. 26, 2024 (Year: 2013).*
"How to Interpret an IP Rating Chart" by Brandon Rogers, Jun. 23, 2016, retrieved from: https://www.setra.com/blog/how-to-interpret-an-ip-rating-chart Date: Sep. 26, 2024 (Year: 2016).*
International Search Report (PCT/ISA/210) issued in PCT Application No. PCT/EP2019/064906 dated Jul. 30, 2019 with English translation (five (5) pages).
German-language Written Opinion (PCT/ISA/237) issued in PCT Application No. PCT/EP2019/064906 dated Jul. 30, 2019 (six (6) pages).
German-language Office Action issued in German Application No. 10 2018 210 975.3 dated Feb. 5, 2019 (eight (8) pages).

* cited by examiner

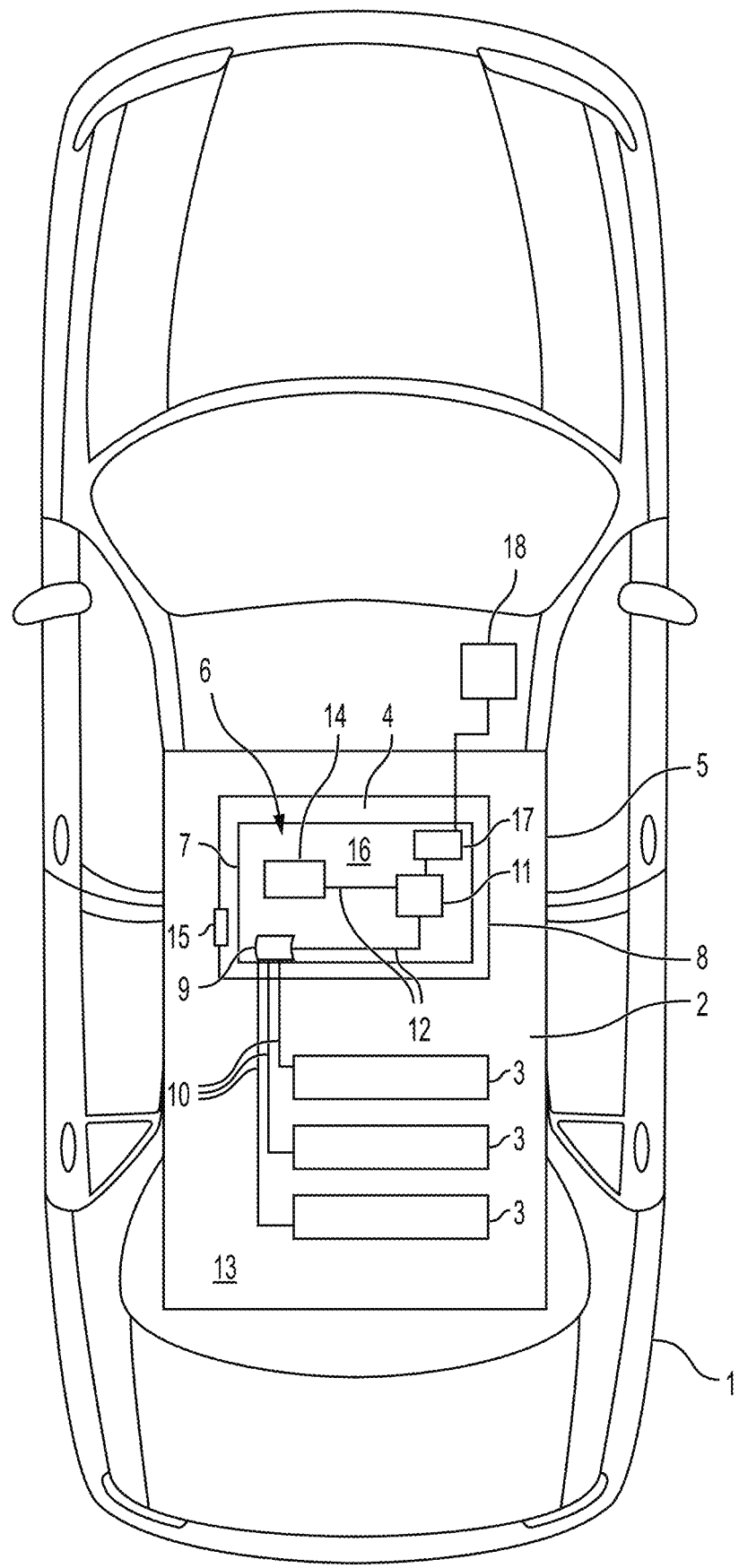

BATTERY MANAGEMENT SYSTEM FOR A HIGH-VOLTAGE BATTERY OF A MOTOR VEHICLE, HIGH-VOLTAGE BATTERY, AND MOTOR VEHICLE

BACKGROUND AND SUMMARY OF THE INVENTION

The invention relates to a battery management system for a high-voltage battery of a motor vehicle for monitoring battery cells of the high-voltage battery, which battery management system is arrangeable in a battery housing of the high-voltage battery and has an electronic circuit, arranged on a circuit carrier, with a processor and with a communication interface for communicating with at least one in-vehicle, high-voltage-battery-external device. The invention additionally relates to a high-voltage battery and to a motor vehicle.

The present concern is in particular high-voltage batteries or high-voltage storage batteries for electrically propelled motor vehicles, for example electric or hybrid vehicles. High-voltage batteries of this kind have a plurality of battery cells, which are usually arranged in a cell assembly and interconnected to form a battery module. The battery cells may be lithium ion cells, for example, and arranged in a battery housing of the high-voltage battery. For example, a cell-internal short in one of the battery cells can result in a thermal runaway, that is to say in a self-amplifying thermal process, of the battery cell. The rising energy density of the high-voltage battery or of the high-voltage store on account of a higher packing density of the battery cells means that there is an increasing risk of adjacent battery cells likewise running away on account of the high level of heat generation during the short in a battery cell. In the event of thermal runaway of multiple battery cells, the high-voltage battery can catch fire in the worst case, which could endanger occupants of the motor vehicle. It is therefore desirable to detect such a thermal runaway or thermal event in order to be able to warn the vehicle occupants.

The prior art discloses the practice of monitoring the battery cells with sensors, for example temperature sensors and voltage sensors, that are electrically connected to a battery management system of the high-voltage battery via measurement lines. To detect the thermal runaway, the temperature and voltage of the battery cells can be monitored, for example. Detection of the thermal runaway on the basis of the sensor signals can be ensured only if the measurement lines are not damaged by the thermal event before the sensor data reach a processor of the battery management system, however. The very high temperatures close to the battery cell that is degassing on account of the thermal event (>1200° C.) mean that this can be ensured only with difficulty, in particular if the sensors, lines and voltage taps are situated very close to degassing openings of the battery cells by design. In order to prevent these components from being damaged, they need to be protected by special fire protection measures, or the lines need to be laid in the battery housing in a complex manner. This has adverse effects on costs and weight of the high-voltage battery. Additionally, the inertia of the sensors and the processing and rating of the signals in the processor after the occurrence of the thermal event mean that a certain period of time is needed before the thermal event is detected and the vehicle occupants are warned.

It is an object of the present invention to be able to detect a thermal runaway of a battery cell of a high-voltage battery of a motor vehicle in a particularly simple and reliable manner.

This object is achieved according to the invention by a battery management system, a high-voltage battery and a motor vehicle having the features according to the respective independent patent claims. Advantageous embodiments of the invention are the subject of the dependent patent claims, the description and the FIGURE.

A battery management system according to the invention for a high-voltage battery of a motor vehicle is used among other things for monitoring battery cells of the high-voltage battery. The battery management system is arrangeable in a battery housing of the high-voltage battery and has an electronic circuit, arranged on a circuit carrier, with a processor and with a communication interface for communicating with at least one in-vehicle, high-voltage-battery-external device. Furthermore, the electronic circuit additionally has at least one pressure sensor designed to capture pressure signals in the battery housing and to convey the pressure signals to the processor. The processor is designed to take the conveyed pressure signals as a basis for detecting a thermal runaway of at least one battery cell of the high-voltage battery, to generate a signal on detection of the thermal runaway and to provide the signal to the communication interface for conveyance to the device.

The invention additionally relates to a high-voltage battery for a motor vehicle, having a plurality of interconnected battery cells, a battery housing and a battery management system according to the invention, wherein the battery cells and the battery management system are arranged in the battery housing.

The battery management system (BMS), or the battery control unit, forms the central high-voltage battery electronics and comprises the circuit carrier, or the circuit board, with the electronic circuit. The BMS is arranged in the battery housing of the high-voltage battery. The battery housing has in particular a housing base facing a road for the motor vehicle and a housing cover facing a passenger compartment of the motor vehicle. In particular, the BMS is arranged in the region of the housing cover and hence at a distance from the housing base. The BMS can therefore be protected from damage, for example when driving over an obstacle close to the ground and/or as a result of liquids penetrating the battery housing.

The electronic circuit has the communication interface via which the BMS is electrically connected to the motor vehicle, or to the device thereof. The device can be for example a control unit of the motor vehicle and/or a warning device for outputting warning signals. Additionally, the electronic circuit can comprise for example a measurement interface via which the battery management system is coupled to the battery cells of the high-voltage battery, for example by means of measurement lines. Additionally, the measurement interface can communicate with the processor, for example via conductor tracks. The measurement lines can be used to transmit battery-cell-specific data, for example sensor data from sensors close to the cells, to the BMS for evaluation by the processor of the BMS.

Additionally, the BMS is designed to detect a thermal runaway of a battery cell of the high-voltage battery. To this end, the at least one pressure sensor is additionally arranged on the circuit carrier. The pressure sensor is thus integrated in the high-voltage battery electronics. The pressure sensor may be in the form of a particularly space-saving MEMS (micro-electromechanical system) component. The pressure sensor is designed to capture pressure signals in an interior of the battery housing and to convey said pressure signals to the processor, which is likewise arranged on the circuit carrier. In particular, the at least one pressure sensor is in the form of an absolute pressure sensor. The absolute pressure sensor measures the absolute pressure, that is to say the pressure in comparison with a vacuum as a reference point. By measuring the absolute pressure, inaccuracies in the atmospheric air pressure as a reference can be eliminated. Additionally, it is not necessary to pass through the battery housing in order to be able to use an exterior pressure outside the battery housing as a reference. The circuit carrier with the absolute pressure sensor can thus be positioned freely in the battery housing. The use of the absolute pressure sensor therefore permits particularly unproblematic and inexpensive pressure detection.

The processor is designed to analyze the pressure signals and to take the pressure signals as a basis for detecting the thermal event, since a thermal event in a battery cell is linked to a distinct, quickly spreading pressure rise in the interior of the battery housing. This also applies if the battery housing has a pressure compensation element for atmospheric pressure compensation, for example a breathable membrane, and this membrane tears in the event of the thermal runaway of the battery cell(s). This pressure rise is then detected by means of the at least one pressure sensor. The use of the pressure sensor results in the advantage, in comparison with the use of sluggish temperature sensors, that the thermal event can be detected particularly quickly, even with just one pressure sensor in the interior of the battery housing.

As soon as the processor has detected the thermal event by evaluating the pressure signal, it generates the signal and provides said signal to the communication interface for conveyance to the device. The device may be designed for example to initiate a predetermined measure as a reaction to the pressure rise in the battery housing. Preferably, the processor is designed to generate a warning signal for a vehicle occupant of the motor vehicle as the signal on detection of the thermal runaway and to provide said warning signal to the communication interface for conveyance to the device in the form of a warning device. The warning device can comprise for example a warning lamp and/or a loudspeaker, so that a visual and/or an audible warning signal can be output to the vehicle occupants as the warning signal. The warning signal allows the vehicle occupants to be advised of the possibly imminent burning of the high-voltage battery and to leave the motor vehicle in good time.

The arrangement of the pressure sensor on the circuit carrier of the BMS results in the advantage that the pressure signal can be evaluated by the processor directly at the location of capture and can be quickly provided to the communication interface for transmission to the high-voltage-battery-external device, for example the warning device. To this end, the processor may be electrically connected to the at least one pressure sensor via conductor tracks, for example. The pressure signals thus do not have to be conveyed to the processor via measurement lines laid through the battery housing. The thermal event can therefore be reliably detected even if the measurement lines are destroyed. It is therefore not necessary for fire protection measures to be provided for the measurement lines, which means that the high-voltage battery is in a particularly low-weight and inexpensive form.

There may be provision for the processor to be designed to take the pressure signals as a basis for determining a rate of pressure change and to detect the thermal runaway if a value of the rate of pressure change exceeds a predetermined threshold value. The pressure signal can be taken as a basis for capturing values of the pressure in the interior of the battery housing over a predetermined period of time and storing said values in a ring memory of the electronic circuit, for example. The highest and lowest pressure values occurring during the period of time can be taken as a basis for determining the rate of pressure change by means of the processor and comparing said rate of pressure change with the threshold value. If the threshold value is exceeded, the thermal event is detected.

In a development of the invention, the battery management system has a housing in which the circuit carrier is arranged, wherein the housing has at least one pressure compensation element for a pressure compensation between an interior of the housing of the battery management system and an interior of the battery housing. The housing allows the components or parts of the electronic circuit to be protected. To still be able to capture the pressure signals in the interior of the battery housing, the housing of the BMS has the pressure compensation element, for example in the form of a breathable membrane, or a deliberate leakiness in the housing. It is thus possible to ensure that a pressure rise taking place in the interior of the battery housing on account of the thermal runaway of a battery cell is also measurable in the interior of the housing of the BMS.

A motor vehicle according to the invention comprises a high-voltage battery according to the invention. The motor vehicle is in particular in the form of an electric or hybrid vehicle. Preferably, the motor vehicle comprises a device in the form of a warning device for outputting a warning signal for a vehicle occupant of the motor vehicle on detection of the thermal runaway. The warning device can comprise a loudspeaker and/or a warning lamp, for example. The warning device may be electrically connected to the communication interface of the BMS via in-vehicle communication lines, for example.

The embodiments presented with reference to the battery management system according to the invention, and the advantages of said embodiments, apply accordingly to the high-voltage battery according to the invention and to the motor vehicle according to the invention.

Further features of the invention will emerge from the claims, the FIGURE and the description of the FIGURE. The features and combinations of features cited in the description hereinabove and the features and combinations of features cited in the description of the FIGURE hereinbelow and/or shown in the FIGURE alone are usable not only in the particular indicated combination but also in other combinations or on their own.

The invention will now be explained in more detail on the basis of a preferred exemplary embodiment and with reference to the drawing.

BRIEF DESCRIPTION OF THE DRAWING

The single FIGURE shows a schematic depiction of an embodiment of a motor vehicle according to the invention.

DETAILED DESCRIPTION OF THE DRAWING

The FIGURE shows a schematic depiction of a motor vehicle 1, which is in particular in the form of an electrically driven motor vehicle. The motor vehicle 1 comprises a high-voltage battery 2 with a plurality of interconnected battery cells 3 and with a battery management system 4, or battery control unit, for monitoring and controlling the battery cells 3. The battery cells 3 and the battery management system 4 are arranged in a battery housing 5 of the high-voltage battery 2. The battery management system 4 comprises an electronic circuit 6 that is arranged on a circuit carrier 7, or a circuit board, of the battery management system 4. The circuit carrier 7 with the electronic circuit 6 is arranged in a housing 8 of the battery management system 4 in this instance.

The electronic circuit 6 in this instance has a measurement interface 9, which is electrically connected to the battery cells 3 via measurement lines 10. The measurement lines 10 can be used to convey battery-cell-specific data from the battery cells 3 to a processor 11 of the electronic circuit 6. There may also be provision for signals to be conveyed from the processor 11 to the battery cells 3. The battery-cell-specific data may be sensor data from sensors close to the cells, for example, which the processor 11 can evaluate and which can be taken as a basis for the battery management system 4 to monitor the battery cells 3. The signals conveyed to the battery cells 3 may be signals for cell balancing, for example. The processor 11 is likewise arranged on the circuit carrier 7. The communication between the measurement interface 9 and the processor 11 can take place via conductor tracks 12, for example.

A cell-internal short in one of the battery cells 3 can result in a thermal runaway of the battery cell 3 occurring. The resultant heat generation in an interior 13 of the battery housing 5 can result in a thermal runaway of all of the battery cells 3, which in turn can result in a fire in the high-voltage battery 2. In order to be able to warn vehicle occupants of the motor vehicle 1 about this destruction of the high-voltage battery 2, the thermal runaway of the battery cell(s) 3 is supposed to be detected. For example, the thermal runaway can be detected on the basis of the sensor data of the sensors of the battery cells 3 that are conveyed via the measurement lines 10. However, it may be that the measurement lines 10 are severed by a gas escaping from the runaway battery cell 3, which means that the sensor data can no longer be transmitted to the processor 11.

In order to still be able to reliably detect the thermal runaway, the battery management system 4 has at least one pressure sensor 14, which is a component of the electronic circuit 6 and is therefore likewise arranged on the circuit carrier 7 together with the processor 11. The pressure sensor 14 is designed to capture pressure signals describing a pressure in the interior 13 of the battery housing 5 and to convey said pressure signals to the processor 11, for example via a conductor track 12. The pressure sensor 14 is in particular an absolute pressure sensor, which may be in the form of an MEMS component, for example.

In order to be able to reliably capture the pressure signals in the interior 13 of the battery housing 5, the housing 8 of the battery management system 4 is in non-gastight form. By way of example, the housing 8 can have a pressure compensation element 15 that permits a pressure compensation between the interior 13 of the battery housing 5 and an interior 16 of the housing 8. The pressure compensation element 15 can be a breathable membrane, for example. The processor 11 is designed to take the pressure signals as a basis for detecting the thermal runaway. By way of example, the processor 11 detects the thermal runaway if a rate of pressure change determined on the basis of the pressure signal exceeds a predetermined threshold value.

The electronic circuit 6 in this instance additionally has a communication interface 17 that can communicate with the motor vehicle 1, in particular with a device 18 of the motor vehicle 1. As soon as the processor 11 has detected the thermal runaway on the basis of the pressure signal conveyed by the pressure sensor 14, it can generate a signal, for example a warning signal, and provide said signal to the communication interface 17. The latter conveys the warning signal to the device 18, which is in the form of a warning device, for example, and which then outputs the warning signal to the vehicle occupants. The warning signal can ask the vehicle occupants to leave the motor vehicle 1, for example. The warning device can have a warning lamp and/or a loudspeaker arranged in a passenger compartment, for example. There may also be provision for the device 18 to be an in-vehicle control unit that itself generates a warning signal for a warning device on receiving the signal generated by the processor 11.

LIST OF REFERENCE SIGNS

1 motor vehicle
2 high-voltage battery
3 battery cell
4 battery management system
5 battery housing
6 electronic circuit
7 circuit carrier
8 housing
9 measurement interface
10 measurement lines
11 processor
12 conductor track
13 interior of the battery housing
14 pressure sensor
15 pressure compensation element
16 interior of the circuit carrier housing
17 communication interface
18 device

What is claimed is:

1. A system for a high-voltage battery of a motor vehicle for monitoring battery cells of the high-voltage battery, comprising:
    a battery management system arrangeable in a battery housing of the high-voltage battery, the battery management system comprising an electronic circuit, wherein:
    the electronic circuit is arranged on a circuit carrier within the battery management system,
    the electronic circuit comprises:
        a processor,
        a communication interface for communicating with at least one in-vehicle, high-voltage-battery-external device, and
        at least one pressure sensor designed to capture pressure signals in the battery housing and to convey said pressure signals to the processor, and
    the processor is configured to:
        take the conveyed pressure signals as a basis for detecting a thermal runaway of at least one battery cell of the high-voltage battery,
        generate a signal on detection of the thermal runaway, and
        provide the signal to the communication interface for conveyance to the device,
    the battery management system has a housing in which the circuit carrier is arranged,
    the housing of the battery management system has at least one pressure compensation element for a pressure compensation between an interior of the housing of the battery management system and an interior of the battery housing, and the at least one pressure compensation element is a gas-permeable barrier between the interior of the housing of the battery management system and the interior of the battery housing, and the at least one pressure compensation element remains in place during a pressure rise within the interior of the battery housing.

2. The system according to claim 1, wherein the at least one pressure sensor is an absolute pressure sensor.

3. The system according to claim 1, wherein the processor is configured to take the pressure signals as a basis for determining a rate of pressure change and to detect the thermal runaway if a value of the rate of pressure change exceeds a predetermined threshold value.

4. The system according to claim 1, wherein the processor is configured to generate a warning signal for a vehicle occupant of the motor vehicle as the signal on detection of the thermal runaway and to provide said warning signal to the communication interface for conveyance to the device in the form of a warning device.

5. A high-voltage battery for a motor vehicle, comprising:
a plurality of interconnected battery cells;
the battery housing; and
the battery management system according to claim 1, wherein
the battery cells and the battery management system are arranged in the battery housing.

6. A motor vehicle comprising the high-voltage battery according to claim 5.

7. The motor vehicle according to claim 6, further comprising:
an in-vehicle, high-voltage-battery-external, warning device for outputting a warning signal for a vehicle occupant of the motor vehicle on detection of the thermal runaway.

8. The system according to claim 1, wherein the at least one pressure compensation element comprises a breathable membrane.

9. The system according to claim 1, wherein the at least one pressure compensation element comprises a leakiness in the housing of the battery management system.

* * * * *